(12) United States Patent  
Jain et al.

(10) Patent No.: US 8,861,446 B2
(45) Date of Patent: Oct. 14, 2014

(54) METHODS AND APPARATUSES FOR CHANNEL SELECTION

(75) Inventors: Avinash Jain, San Diego, CA (US); Mohammad Hossein Taghavi Nasrabadi, San Diego, CA (US); Hemanth Sampath, San Diego, CA (US); Vincent Knowles Jones, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 381 days.

(21) Appl. No.: 12/905,586

(22) Filed: Oct. 15, 2010

(65) Prior Publication Data

US 2011/0255487 A1 Oct. 20, 2011

Related U.S. Application Data

(60) Provisional application No. 61/300,867, filed on Feb. 3, 2010.

(51) Int. Cl.
*H04W 72/00* (2009.01)

(52) U.S. Cl.
USPC ........................................................ 370/329

(58) Field of Classification Search
USPC ........................................................ 370/329
See application file for complete search history.

(56) References Cited

U.S. PATENT DOCUMENTS

| | | | | |
|---|---|---|---|---|
| 5,680,142 A | * | 10/1997 | Smith et al. | 342/372 |
| 6,393,303 B1 | * | 5/2002 | Katz | 455/562.1 |
| 2009/0131065 A1 | * | 5/2009 | Khandekar et al. | 455/452.1 |

FOREIGN PATENT DOCUMENTS

| | | |
|---|---|---|
| EP | 1942690 A2 | 7/2008 |
| WO | 2008087592 A2 | 7/2008 |
| WO | 2009134019 A2 | 11/2009 |

OTHER PUBLICATIONS

International Search Report and Written Opinion—PCT/US2010/061914, International Search Authority—European Patent Office—Mar. 18, 2011.
Tetsuro Ueda, et al., "Direction and Communication-Aware Directional Mac Protocol in Ad Hoc Networks Using Directional Antenna", Personal, Indoor and Mobile Radio Communications, 2006 IEEE 17TH Inter National Symposium on, IEEE, P1, Sep. 1, 2006, pp. 1-5, XP031023506, ISBN: 978-1-4244-0329-5.

* cited by examiner

*Primary Examiner* — Sulaiman Nooristany
(74) *Attorney, Agent, or Firm* — Dang M. Vo

(57) ABSTRACT

Various methods and apparatuses for channel selection based on energy levels are disclosed. In one aspect, an apparatus for communication is disclosed, the apparatus comprising a processing system configured to determine, for each of one or more channels, a plurality of energy levels of a respective plurality of signals received via a respective plurality of beam directions and to select one of the channels based on the determined energy levels and a transceiver configured to communicate over the selected channel.

29 Claims, 8 Drawing Sheets

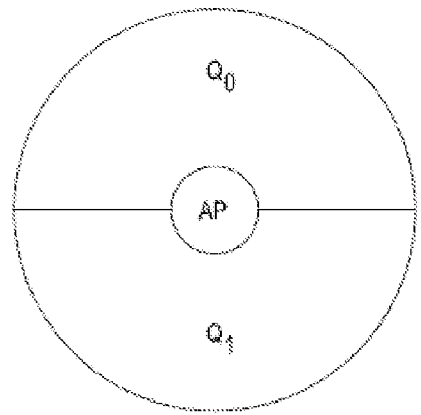
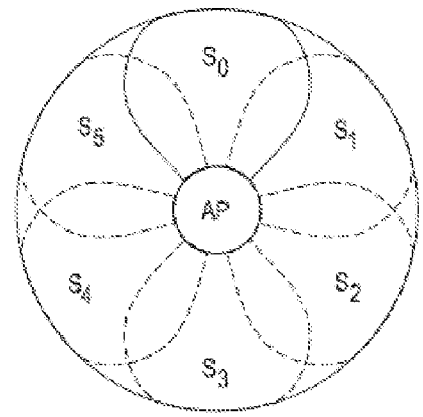
FIG. 3A  FIG. 3B
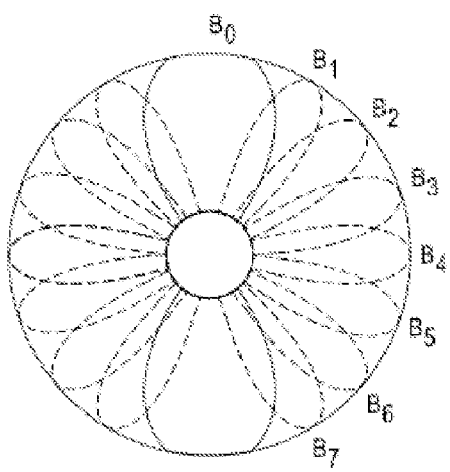
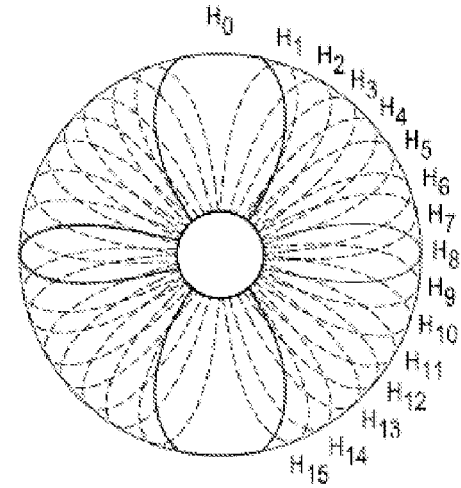
FIG. 3C  FIG. 3D

METHODS AND APPARATUSES FOR CHANNEL SELECTION

CROSS-REFERENCE TO RELATED APPLICATIONS

This application claims priority under 35 U.S.C. §119(e) to U.S. Provisional Application No. 61/300,867, filed Feb. 3, 2010, which is hereby incorporated by reference in its entirety.

BACKGROUND

1. Field

The present disclosure relates generally to communication systems, and more particularly, to the selection of a channel.

2. Introduction

In order to address the issue of increasing bandwidth requirements that are demanded for wireless communications systems, different schemes are being developed to allow communication over one or more channels while achieving high data throughputs. These schemes may include protocols for transmission or reception of data and control information, forms of signal modulation, or utilization of a physical (PHY) layer and a Medium Access Control (MAC) layer.

SUMMARY

The systems, methods, apparatuses, and computer-readable mediums of the invention each have several aspects, no single one of which is solely responsible for its desirable attributes. Without limiting the scope of this invention as expressed by the claims which follow, its more prominent features will now be discussed briefly. After considering this discussion, and particularly after reading the section entitled "Detailed Description" one of ordinary skill in the art will appreciate how the features of this invention provide for channel selection.

One aspect is a method of communicating, the method comprising determining, for each of one or more channels, a plurality of energy levels of a respective plurality of signals received via a respective plurality of beam directions, selecting one of the channels based on the determined energy levels, and communicating over the selected channel.

Another aspect is an apparatus for communicating, the apparatus comprising a processing system configured to determine, for each of one or more channels, a plurality of energy levels of a respective plurality of signals received via a respective plurality of beam directions and to select one of the channels based on the determined energy levels and a transceiver configured to communicate over the selected channel.

Another aspect is an apparatus for communicating, the apparatus comprising means for determining, for each of one or more channels, a plurality of energy levels of a respective plurality of signals received via a respective plurality of beam directions, means for selecting one of the channels based on the determined energy levels, and means for communicating over the selected channel.

Another aspect is a computer program product comprising a computer readable medium comprising instructions that when executed cause an apparatus to determine, for each of one or more channels, a plurality of energy levels of a respective plurality of signals received via a respective plurality of beam directions, select one of the channels based on the determined energy levels, and communicate over the selected channel.

Another aspect is a wireless node comprising at least one antenna configured to receive a plurality of wireless signals via a respective plurality of beam directions, a processing system configured to determine, for each of one or more channels, a plurality of respective energy levels for the plurality of wireless signals and to select one of the channels based on the determined energy levels, and a transceiver configured to communicate, via the at least one antenna, over the selected channel.

BRIEF DESCRIPTION OF THE DRAWINGS

These and other sample aspects of the invention will be described in the detailed description that follow, and in the accompanying drawings.

FIGS. 3A-3D illustrate aspects of beamforming for use in the communication system illustrated in FIG. 1.

Figure 1:
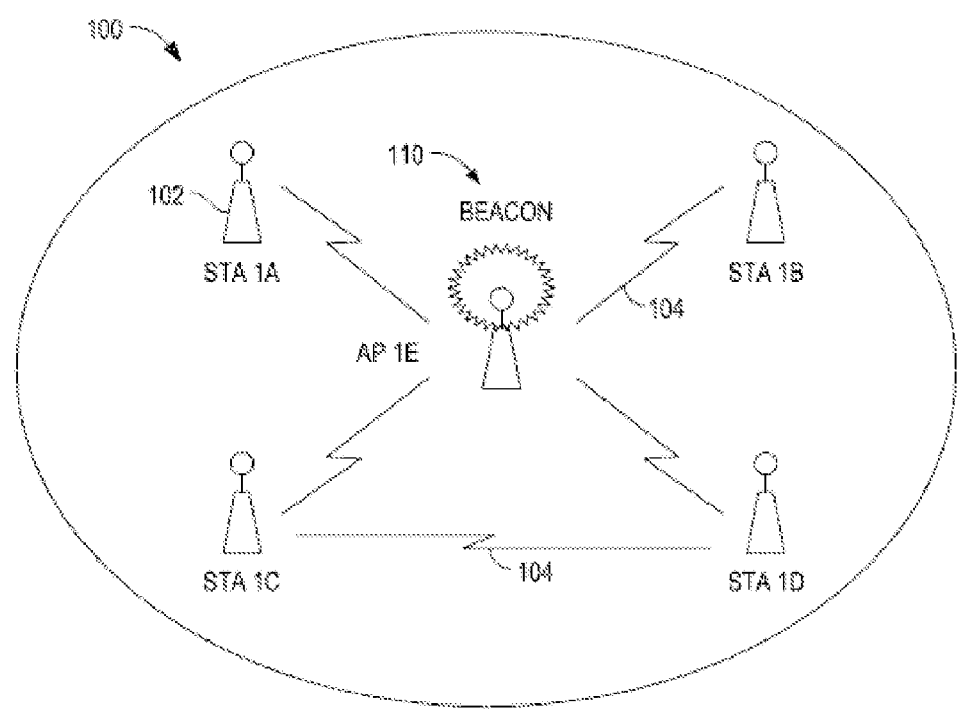
FIG. 1 illustrates a block diagram of a communication system according to an aspect.

In accordance with common practice, the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus, device, system, method, or any other illustrated component or process. Like reference numerals may be used to denote like features throughout the specification and figures.

DETAILED DESCRIPTION

Various aspects of methods, systems, and apparatuses are described more fully hereinafter with reference to the accompanying drawings. These methods, systems, and apparatuses may, however, be embodied in many different forms and should not be construed as limited to any specific structure or function presented throughout this disclosure. Rather, these aspects are provided so that this disclosure will be thorough and complete, and will fully convey the scope of these methods, systems, and apparatuses to those skilled in the art. Based on the descriptions herein, one skilled in the art should appreciate that that the scope of the disclosure is intended to cover any aspect of the methods, systems, and apparatuses disclosed herein, whether implemented independently of or combined with any other aspect of the disclosure. For example, a system or apparatus may be implemented or a method may be practiced using any number of the aspects set forth herein. In addition, the scope of the disclosure is intended to cover such an apparatus, system, or method which is practiced using other structure, functionality, or structure and functionality in addition to or other than the various aspects of the disclosure set forth herein. It should be understood that any aspect of the disclosure herein may be embodied by one or more elements of a claim.

One skilled in the art should appreciate that an aspect disclosed herein may be implemented independently of any other aspects and that two or more of these aspects may be combined in various ways. For example, an apparatus may be implemented or a method may be practiced using any number of the aspects set forth herein. Similarly, methods disclosed herein may performed by one or more computer processors configured to execute instructions retrieved from a computer readable storage medium stored as code. A computer readable storage medium stores information, such as data or instructions, for some interval of time, such that the information can be read by a computer during that interval of time. Examples of computer readable storage media are memory, such as random access memory (RAM), and storage, such as hard drives, optical discs, flash memory, floppy disks, magnetic tape, paper tape, punch cards, and Zip drives.

In some aspects, a wireless communications system described herein may comprise a wireless area network. For example, the system may comprise a wireless local area network (WLAN) or a wireless personal area network (WPAN). A WLAN may be implemented according to one or more existing or developing standards, for example the Institute of Electrical Engineers (IEEE) 802.11 standard. The IEEE 802.11 standard denotes a set of WLAN air interface standards developed by the IEEE 802.11. For example, systems described herein may be implemented according to any one of the 802.11ad, 802.11ac, 802.11a, 802.11b, 802.11g, and 802.11n standards. Similarly, a WPAN may be implemented according to one or more of the IEEE standards, for example the IEEE 802.15 standard. The IEEE 802.15 standard denotes a set of WPAN air interface standards developed by the IEEE committee. For example, systems described herein may be implemented according to any one of the 802.11ad, 802.15.3b, 802.15.3c, 802.15.4a, 802.15.4b, and 802.15.4c standards. Such area networks may support Multiple Input/Multiple Output (MIMO) technology. In addition, the systems described herein may be implemented according to a Bluetooth standard.

Those of skill in the art will recognize that although the system described herein may be implemented according to one or more of the above standards, the system described herein is not limited to such implementations. In addition, those of skill in the art will recognize that while a system may be described as implementing one of these standards, devices present in the system may additionally or alternatively implement another standard. In this situation, it may be beneficial to account for devices that use such other standard in selecting the features of the system. For example, the system may not be configured to receive communications from the other devices, although it may be beneficial for the system to account for such communications from the other devices. In some aspects, the communications from the other devices may interfere with system messages unless select transmission and reception schemes are implemented.

In some aspects, for example in systems implemented according to the 802.11ad or 802.15.3c standards, the PHY layer may be used for millimeter wave (e.g., with carrier frequency of approximately 60 GHz) communications. For example, the system may be configured for millimeter wave communications in the 57 GHz-66 GHz spectrum (e.g., 57 GHz-64 GHz in the United States, and 59 GHz-66 GHz in Japan). Such implementations are particularly beneficial for use with short-range communications (e.g., several meters to tens of meters). For example, the system may be configured to operate within a conference room and to provide wireless communication capabilities between devices located within the conference room.

Systems utilizing a millimeter wave may have a central entity, such as an access point (AP)/point coordination function (PCF) that manages communications between different devices, also called stations (STAs). Having a central entity may simplify design of communication protocols. In some aspects, there may be a dedicated or predetermined AP. In other systems, a plurality of devices may perform functions of the AP. In some aspects, any device may used as an AP, or the performance of AP functionality may rotate between different devices. In some aspects, there may be a dedicated or predetermined AP, or a STA may be used to implement AP functionality, or there may be a dedicated or predetermined AP in combination with one or more STAs performing AP functionality.

An AP may comprise, be implemented as, or be referred to as a base station, a base transceiver station, a station, a terminal, a node, an access terminal acting as an access point, a WLAN device, a WPAN device, or some other suitable terminology. An access point (AP) may also comprise, be implemented as, or be referred to as a NodeB, Radio Network Controller (RNC), eNodeB, Base Station Controller (BSC), Base Transceiver Station (BTS), Base Station (BS), Transceiver Function (TF), Radio Router, Radio Transceiver, Basic Service Set (BSS), Extended Service Set (ESS), Radio Base Station (RBS), or some other terminology.

A STA may comprise, be implemented as, or be referred to as an access terminal, a user terminal, a mobile station, a subscriber station, a station, a wireless device, a terminal, a node, or some other suitable terminology. An STA may be also comprise, be implemented as, or be referred to as a remote station, a remote terminal, a user agent, a user device, user equipment, or some other terminology.

In some aspects, an STA may comprise a cellular telephone, a cordless telephone, a Session Initiation Protocol (SIP) phone, a wireless local loop (WLL) station, a personal digital assistant (PDA), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless medium.

Although particular aspects are described herein, many variations and permutations of these aspects fall within the scope the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description, and drawings that will hereinafter be described, are merely illustrative of the disclosure rather than limiting.

FIG. 1 illustrates an aspect of a wireless communication system 100. As illustrated, the system 100 may include a number of wireless nodes 102 that can communicate with one another using wireless links 104, for example over a PHY layer using waves having a frequency of approximately 60 GHz, as described above. In the illustrated aspect, the wireless nodes 102 include four stations STA 1A-STA 1D, and an access point AP 1E. Although the system 100 is illustrated with five wireless nodes 102, it should be appreciated that any number of nodes, wired or wireless, may form the wireless communication system 100.

Each of the nodes 102 in the system 100 may include, among other things, a wireless transceiver to support wireless communication and controller functionality to manage communication over the network. The controller functionality may be implemented within one or more digital processing devices. The wireless transceiver may be coupled to one or more antennas to facilitate the transmission and reception of signals over a wireless channel. Any type of antennas may be used including, for example, dipoles, patches, helical antennas, antenna arrays, and/or others.

As illustrated, the AP 1E may transmit a beacon signal 110 (or simply a "beacon") to other nodes of the system 100, which may help the other nodes STA 1A-STA 1D to synchronize their timing with the AP 1E, or which may provide other information or functionality. Such beacons may be transmitted periodically. In one aspect, the period between successive transmissions may be referred to as a superframe. Transmission of a beacon may be divided into a number of groups or intervals. In one aspect, the beacon may include, but is not limited to, such information as timestamp information to set a common clock, a peer-to-peer network identifier, a device identifier, capability information, a superframe duration, transmission direction information, reception direction information, a neighbor list, and/or an extended neighbor list, some of which are described in additional detail below. Thus, a beacon may include information both common (e.g. shared) amongst several devices, and information specific to a given device.

In the system 100, the STAs 1A-1D may be distributed throughout a geographic region in such a manner that each STA 1A-1D may not be able to communicate with every other STA 1A-1D. Further, each STA 1A-1D may have a different coverage region over which it may communicate. In some aspects, a peer-to-peer network may be established between two or more of the STAs 1A-1D.

In some aspects, an STA may be required to associate with the AP in order to send communications to and/or receive communications from the AP. In one aspect, information for associating is included in a beacon broadcast by the AP. To receive such beacon, the STA may perform a broad coverage search over a coverage region, for example. A search may also be performed by the STA by sweeping a coverage region in a lighthouse fashion, for example. After receiving the information for associating, the STA may transmit a reference signal, such as an association probe or request, to the AP. In some aspects, the AP may use backhaul services, for example, to communicate with a larger network, such as the Internet or a public switched telephone network (PSTN).

Figure 2:
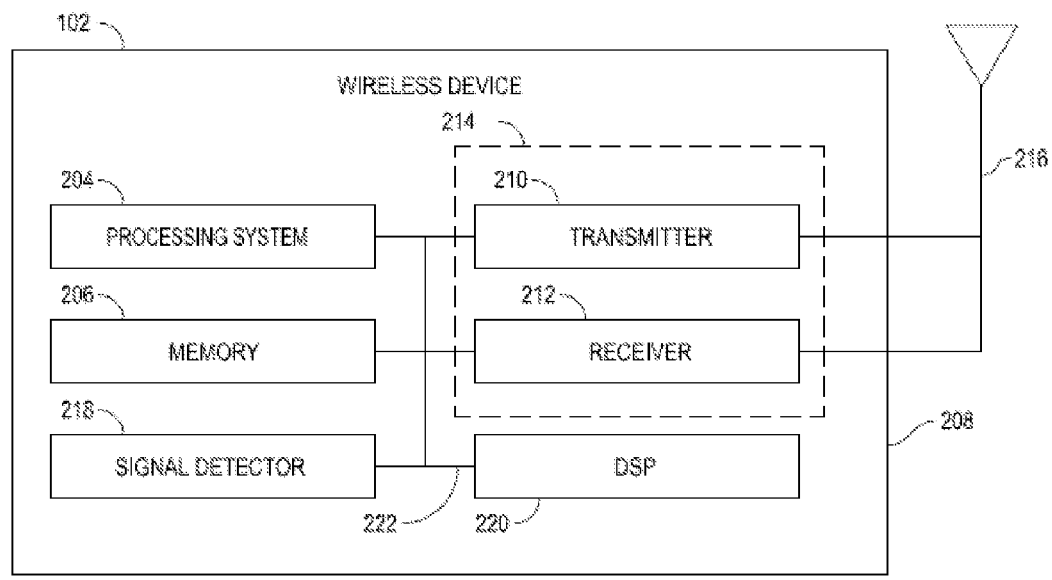
FIG. 2 is illustrates an aspect of a wireless node for use in the communication system illustrated in FIG. 1.

FIG. 2 illustrates an aspect of the wireless node 102 that may be employed within the wireless communication system 100. For example, one or more of the STAs 1A-1D or the AP 1E may be implemented as described with respect to FIG. 2. The wireless node 102 is an aspect of a device that may be configured to implement various methods described herein. The wireless node 102 may be enclosed within a housing 208, or the components of the wireless node 102 may be otherwise supported or grouped together by another structure. In some aspects, the housing 208 or other structure is omitted.

The wireless node 102 may include a processing system 204 which controls operation of the wireless node 102. The processing system 204 may in some aspects be referred to as a central processing unit (CPU). In some aspects, the processing system 204 may comprise or be implemented with a circuit configured to perform at least the functions of the processing system 204. Memory 206, which may include both read-only memory (ROM) and random access memory (RAM) and may be volatile or permanent, may provide instructions and data to the processing system 204. A portion of the memory 206 may also include non-volatile random access memory (NVRAM). The processing system 204 typically performs logical and arithmetic operations based on program instructions stored within the memory 206, but may of course perform other operations. The instructions in the memory 206 may be executable to implement the methods described herein. Additionally, the node 102 may be configured to accept another type of computer readable medium, such as a disk or form of memory card, or may be connected to a computer readable medium, such as a hard drive, which may comprise instructions that when executed cause the node 102 to execute a method or process described herein.

The wireless node 102 may also include a transmitter 210 and a receiver 212 to allow transmission and reception of communications between the wireless node 102 and a remote location. Those of skill in the art will recognize that the transmitter 210 and receiver 212 may be combined into a transceiver 214. An antenna 216 may be attached to the housing 208 and electrically coupled to the transceiver 214. The wireless node 102 may also include (not shown) multiple transmitters, multiple receivers, multiple transceivers, and/or multiple antennas.

Multiple antennas at the wireless node 102 may be used to communicate to improve data throughput without additional bandwidth or transmit power. This may be achieved by splitting a high data rate signal at the transmitter into multiple lower rate data streams with different spatial signatures, thus enabling the receiver to separate these streams into multiple channels and properly combine the streams to recover the high rate data signal. In addition, multiple antennas may enable increased ability to implement beamforming or a plurality of communication beam patterns. In some aspects, one or more antennas are steerable.

The wireless node 102 may also include a signal detector 218 that may be used in an effort to detect and quantify the level of signals received by the transceiver 214. The signal detector 218 may detect such signals as total energy, energy per subcarrier per symbol, power spectral density, and other signals. The wireless node 102 may also include a digital signal processor (DSP) 220 for use in processing signals. Of course, the DSP 220 may be omitted in some aspects, or the functions of the DSP may be performed by the processing system 204.

The various components of the wireless node 102 may be coupled together by a bus system 222, which may include a power bus, a control signal bus, and a status signal bus in addition to a data bus. Of course, the components may be coupled or electrically connected in other ways or using other means as well.

As described above, either an STA, an AP, or both may be implemented according the description of the wireless node 102 above. In some aspects, any device capable of transmitting a beacon signal may serve as an AP. In some aspects, however, in order for an AP to be effective it may have to have a good link quality to all STAs in a network. At high frequencies, where signal attenuation may be relatively severe, communications may be directional in nature and may use beamforming (e.g. beam training) to increase gains. As such, an effective AP may beneficially have a large sector bound (e.g. a wide steering capability). The AP may have a large beamforming gain (which may be provided, for example, by multiple antennas), may be mounted so that a line of sight path exists to most areas served by the wireless system 100, and/or may use a steady power supply for periodic beacon transmissions and other management functions. Even if a device has an antenna steering capability that may be limited to a small sector bound, an available power that may be limited, and/or a location that may be variable, however, the device may in some aspects perform as an AP, for example when forming peer-to-peer networks. Peer-to-peer networks may be used for a variety of purposes, such as side-loading, file sharing, and other purposes. In some aspects, a peer-to-peer network may be created where no device may efficiently transmit to and receive from all other devices.

In some aspects, the wireless node 102 is equipped with multi-mode radios with different frequency transceivers, for example a 60 GHz transceiver, a 2.4 GHz transceiver, a 5GHz transceiver, etc. In some implementations, lower frequency communications may be performed omni-directionally and higher frequency communications may be performed directionally. Such aspects may be advantageous in a network where an omni-directional protocol may be used to locate and set up further communications and where the further communications use a directional protocol.

FIGS. 3A-3D illustrates aspects of beamforming. As described above, the wireless node 102 may be configured to implement one or more types of beamforming, for example using the antenna 216 or a plurality of antennas. Although the beamforming will be described below with respect to an AP, those of skill in the art will appreciate that an STA as described above may implement such beamforming. Those of skill in the art will additionally appreciate that the beamforming described below may refer to signals being transmitted, as well as to a beam or direction in which signals are received. Further, those of skill in the art will appreciate that an AP may implement different beamforming for receiving as for transmitting, and/or may dynamically adjust any such beamforming. The beamforming may also be predetermined.

The term quasi-omni pattern generally relates to the lowest resolution pattern that covers a very broad area of a region of space of interest around a device. An AP, for example as illustrated by AP 1E in FIG. 1 or as implemented as illustrated in FIG. 2, may cover the region of space of interest in a minimal set of, possibly overlapping, quasi-omni patterns. A set size equal to one may indicate that the AP is able to cover the spatial region of interest with only one quasi-omni pattern, indicating that the AP is omni-capable. The quasi-omni transmit and receive patterns may be identified by $Q_n$, where n represents a respective direction. Those of skill in the art will appreciate that the beams may be overlapping, and that each direction denoted by a separate n need not be distinct. A beam pattern having two approximately equal patterns is illustrated in FIG. 3A. In this aspect, n=2.

Of course, beams having a narrower azimuth than described with respect to the quasi-omni pattern may be used. Such narrower beams may be advantageous because each beam may be characterized by a greater gain and increased signal to noise ratio (SNR) as compared to the beams used in the quasi-omni pattern. This is particularly advantageous in systems which experience high signal fading or decay.

FIG. 3B illustrates an aspect of beamforming where the azimuth is narrower than described with respect to the quasi-omni pattern. The transmit and receive patterns are identified by $S_0$-$S_5$. As can be seen in FIG. 3B, the beams formed by the AP may overlap. Of course, the beam pattern may comprise beams which do not overlap. As described above, the AP may be configured to change a direction in which the beam is pointing. Thus, the AP in FIG. 3B may first send and/or receive communications via beam $S_1$, then via beam $S_2$, etc. The AP can, but need not, change directions so as to point the beam in successive directions to form a complete circle (i.e. pointing in directions 0-5 in order, then starting again at 0). The AP may instead change directions in any order, or may randomly select a direction in which to point.

FIGS. 3C and 3D illustrate aspects having even narrower beams. FIG. 3C shows a beam pattern having 16 directions $B_0$-$B_{15}$ (only half of these directions, $B_0$-$B_7$, are numbered in the illustration), and FIG. 3D shows a beam pattern having 32 directions $H_0$-$H_{31}$ (only half of these directions, $H_0$-$H_{15}$, are numbered in the illustration). Narrower beams may provide the advantages discussed above, but may also require additional overhead information, or may require additional time for changing the direction of the beam. Thus, when selecting a number of beams to use, the requisite overhead may need to be considered. Although the beams are illustrated as being substantially symmetric, the beam shapes, sizes, and/or distribution may vary.

The term sector may generally be used to refer to a second level resolution pattern that covers a relatively broad area of multiple beams. A sector can cover a set of consecutive and nonconsecutive beams and different sectors can overlap. Beams can be further divided into high-resolution (HRS) beams as a high level of resolution pattern.

The multi-resolution definition of quasi-omni patterns, sectors, beams and HRS beams may become a multi-level definition, where each level may use a set of antenna patterns. Therefore, quasi-omni patterns may represent a first set of antenna patterns, sectors may represent a second set of antenna patterns, beams may represent a third set of antenna patterns preferably derived from the second set of antenna patterns, and HRS beams may represent a fourth level of antenna patterns preferably derived from the third set of antenna patterns.

Figure 4:
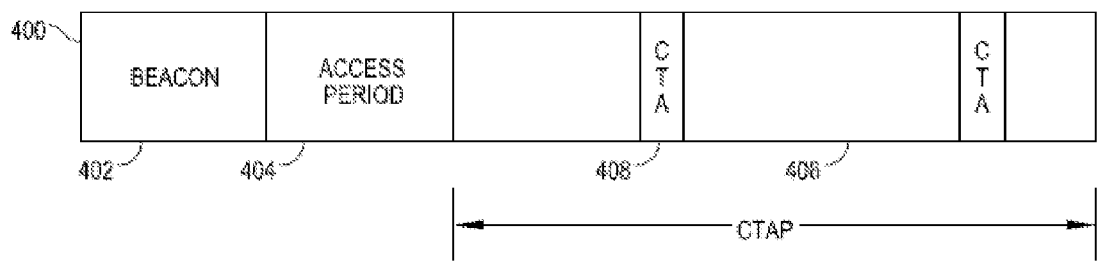
FIG. 4 illustrates an aspect of a superframe structure.

FIG. 4 illustrates an aspect of a superframe structure, as previously described above. The superframe 400 may comprise a beacon interval 402, an access period 404, and a channel time allocation period (CTAP) 406. The CTAP 406 may comprise multiple channel time allocations (CTAs) 408.

Before communication between two devices can occur, a channel should be selected over which the communication will take place. In one aspect, a wireless access point (AP) selects a channel over which to communication with other devices. In another aspect, a device wishing to communicate selects a channel and broadcasts its presence on that channel prior to communication with the other devices. In one aspect, the channel selecting device should select the channel wisely, otherwise other devices may not be able to communicate with the channel selecting device. For example, an AP may erroneously believe that a particular channel is free of interference at a peer device when, in fact, interference present at the peer device could weaken or break a link between the AP and the peer device.

Figure 5:
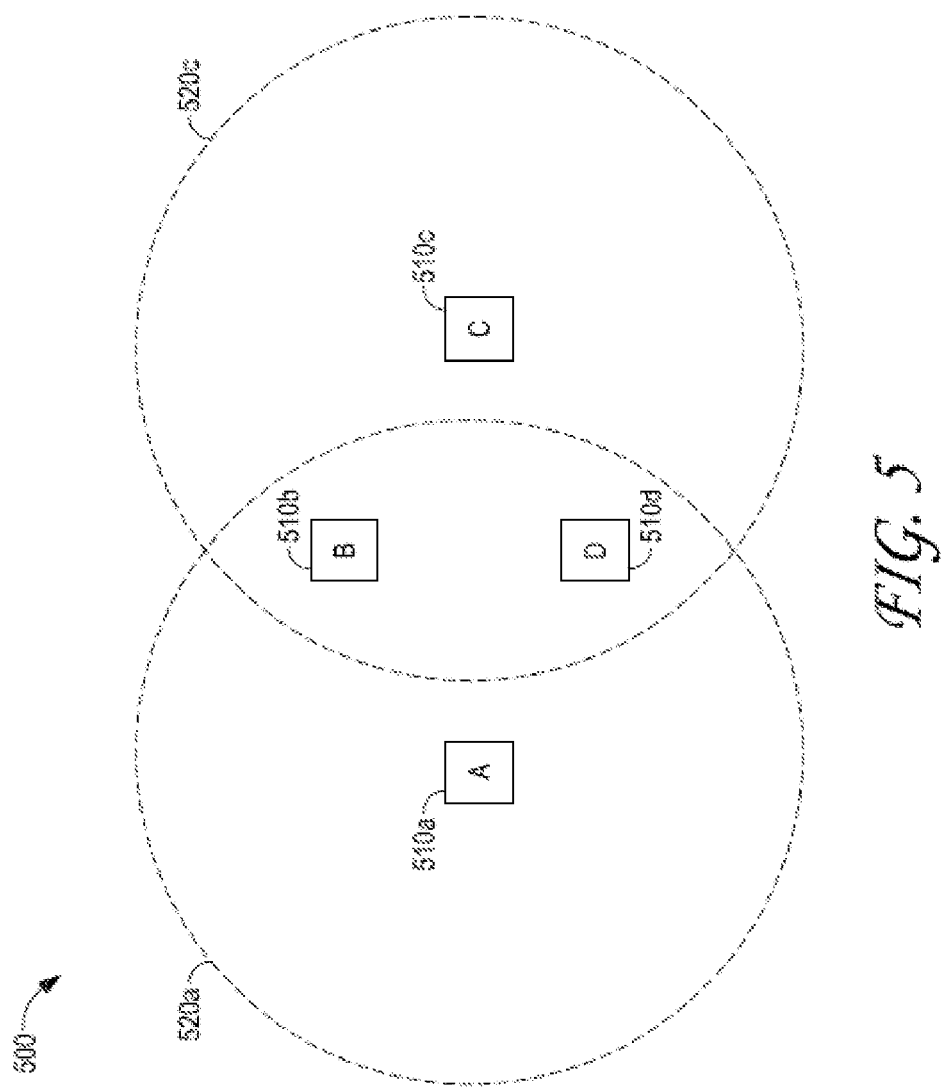
FIG. 5 is a diagram illustrating a wireless communication system with four wireless communication devices.
Figure 6:
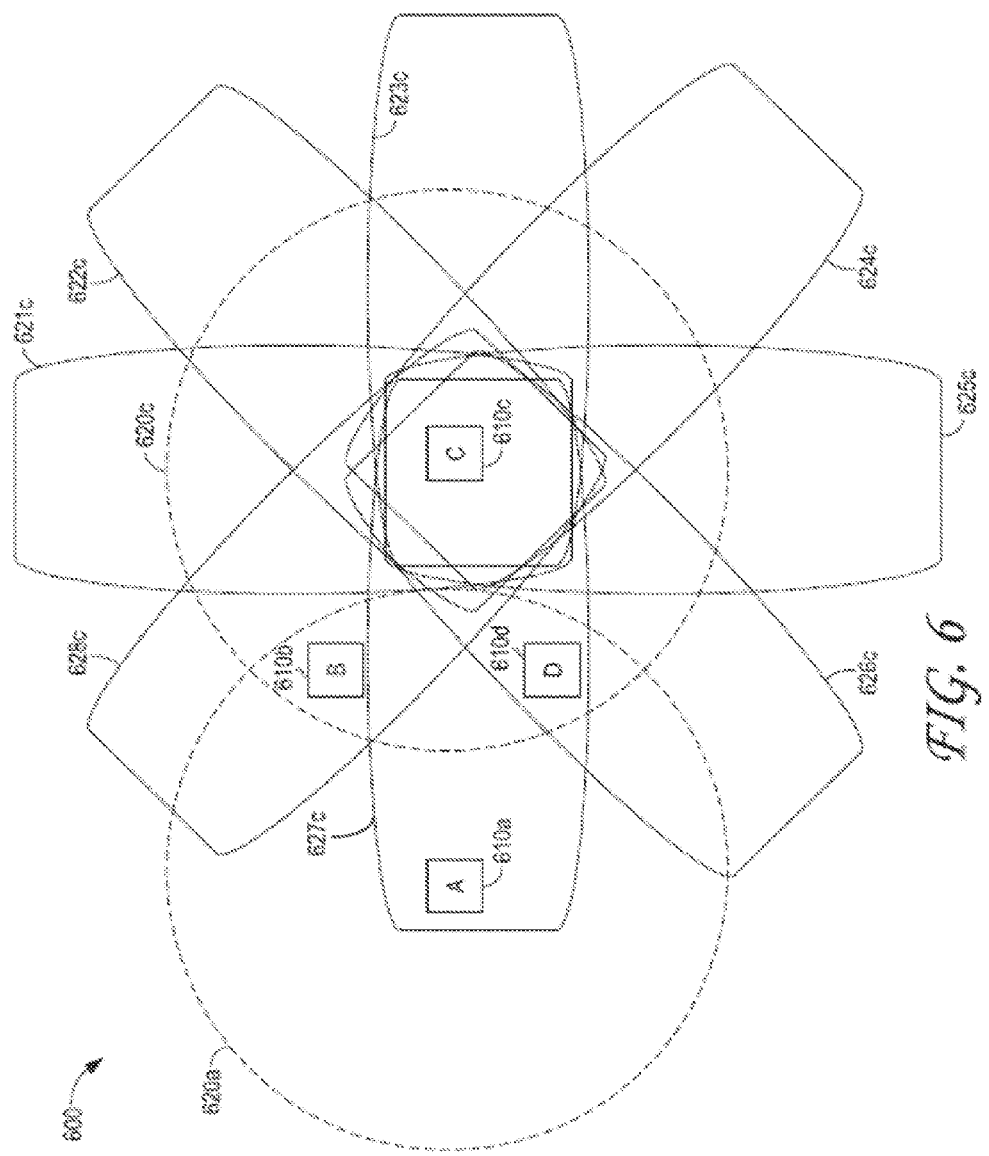
FIG. 6 is diagram illustrating another wireless communication system with four wireless communication devices.

FIGS. 5 and 6 below illustrate example topologies in which this issue, referred to as the hidden node problem, may present itself. In particular, the discussion below with respect to FIG. 5 describes a communication system having omni-directional communication ranges in which the hidden node problem may occur. In FIG. 6, a communication system having an identical topology is described in which the hidden node problem is addressed using directional beam patterns.

FIG. 5 is a diagram illustrating a wireless communication system 500 with four wireless communication devices 510a, 510b, 510c, 510d. The communication range of the first device 520a and the communication range of the third device 520c are illustrated by dashed lines. In the illustrated system 500, the first device 510a is communicating with the second device 510b over a first channel and it is desired that the third device 510c initiate communication with the fourth device 510d. In one aspect, the communication between the first device 510a and the second device 510b is performed using a first protocol or technology and it is desired that the communication between the third device 510c and the fourth device 510d be performed using a second, different protocol or technology. Because the second device 510b is within the communication range of the first device 520a it can receive communications from the first device 510a. Further, because the fourth device 510d is within the communication range of the third device 520c it can receive communications from the third device 510c.

Before communication between the third device 510c and the fourth device 510d can occur, a channel must be selected over which the communication will take place. If the third device 510c initiates communication over the first channel, because the second device 510b is within the communication range of the third device 520c, it is possible that transmission from the third device 510c will interfere with the ongoing communication between the first device 510a and the second device 510b. Further, if communication between the third device 510c and the fourth device 510d is established over the first channel, because the fourth device 510d is within the communication range of the first device 520a, it is possible that the ongoing communication between the first device 510a and the second device 510b will interfere with the communication between the third device 510c and the fourth device 510d.

Accordingly, in selecting a channel, it is desirable to select a channel which is not in use by neighboring devices or networks. In one aspect, if it is desired that a device initiates communication, the device measures the energy level of one or more channels. If the energy level is high, this may indicate that the channel is in use, and a different channel is selected. However, because the first device 510a is not within the communication range of the third device 520c, it is possible that measurement of the energy level of the first channel by the third device 510c will not indicate that the channel is in use, particularly if the first device 510a is primarily transmitting data and the second device 510b is primarily receiving data.

Many devices which operate at high frequency, such as 60 GHz, are equipped with antenna arrays of two or more antennas. By beamforming, the antenna arrays can be used to manipulate the communication range of the device so as to form a beam in a particular direction such that the communication range in that direction is increased and the communication range in other directions is decreased.

FIG. 6 is a diagram illustrating a wireless communication system 600 with four wireless communication devices 610a, 610b, 610c, 610d. The communication range of the first device 620a is illustrated by a dashed line. An omnidirectional communication range of the third device 620c is also illustrated by a dashed line. Further, a plurality of directional communication ranges of the third device 621c - 628c are illustrated by solid lines. In the illustrated system 600, as in the system 500 illustrated in FIG. 5, the first device 610a is communicating with the second device 610b over a first channel and it is desired that the third device 610c initiate communication with the fourth device 610d.

As mentioned above, before communication between the third device 610c and the fourth device 610d can occur, a channel must be selected over which the communication will commence. In order to increase the probability that the third device 610c will detect that the first channel is in use, the third device 610c measures the energy level of the channel using each of the directional communication ranges 621c-628c.

Thus, although the third device 610c may not detect that the channel is in use by measuring the energy level of the first channel using the omnidirectional communication range 620c, it is possible that the third device 610c will detect that the channel is in use by measuring the energy level of the first channel using the directional communication ranges 621c-628c, in particular, using the directional communication range 627c in which the first device 610a is located.

Once the third device 610c has detected that the first channel is in use, the third device 610c will select a different channel over which to initiate communications with the fourth device 610d. In one aspect, the third device 610c may repeat the energy level measurements for a second channel using the directional communication ranges 621c - 628c and determine that the second channel is not in use before initiating communications with the fourth device 610d over the second channel.

Figure 7:
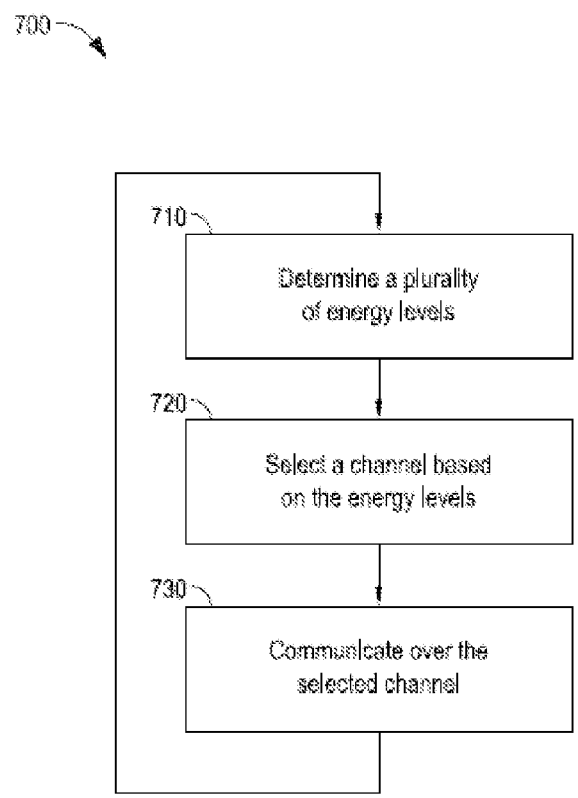
FIG. 7 is a flowchart illustrating a method of communicating.

FIG. 7 is a flowchart illustrating a method 700 of communication. The method 700 begins, in block 710, with determining, for each of one or more channels, an energy level for each of a plurality of receive beam directions. The determination may be performed, for example, by at least one of the processing system 204 and signal detector 218 of FIG. 2. In one aspect, each channel corresponds to a different frequency or frequency band. In another aspect, each channel corresponds to a different transmission code or time-division.

The energy level for a particular beam direction can be determined by analyzing the energy level of a signal received while an antenna array is set to the particular beam direction. The received signal may comprise a data signal, noise, or both. In one aspect, the energy level of the signal is determined by integrating the absolute value of the signal over a defined time period. In another aspect, the energy level of the signal is determined by integrating the absolute value of the signal squared over a defined time period. In one aspect, such integration is weighted according to a windowing function, such as a Hamming window. In another aspect, a defined time period is partitioned into sub-intervals, during each of which a sub-interval energy level is determined. In one aspect, the determined energy level is the maximum of the sub-interval energy levels. For example, the sub-interval can be less than or equal to a period of transmission in a transmit beam direction of an interfering apparatus. One potential advantage of this aspect is that, even if the interfering apparatus is using transmit beam steering, the interference from the interfering apparatus can be measured and avoided.

For example, the sub-interval can be less than or equal to a period of transmission in a transmit beam direction of an interfering apparatus. One potential advantage of this aspect is that, even if the interfering apparatus is using transmit beam steering, the interference from the interfering apparatus can be measured and avoided.

The energy level for a number of different beam directions can be determined sequentially by changing the antenna or antenna array to a different beam direction and measuring the energy accumulated. The energy level for a number of different beam directions can also be determined by analyzing a number of different signals simultaneously received on different antennas of the antenna array by applying different weightings corresponding to the different beam directions. Such determination can be performed serially, in parallel, or in some combination thereof.

In one aspect, an energy level is determined for each of a set of predefined beam directions. In one aspect, the set of predefined beam directions covers the entire space, e.g., that which would be covered with an omnidirection beam or quasi-omni beam. In another aspect, an energy level is determined for less than all of a set predetermined beam directions. In one aspect, an energy level is determined for each of set of dynamically defined beam directions.

In one aspect, the energy level for each of the beam directions is determined for a single channel. For example, if it is determined that the channel is not in use, only one channel may be analyzed. In one aspect, the energy level for each of the beam directions is determined for different channels until a suitable channel is selected. In one aspect, the energy level for each of the beam directions is determined for a defined number of channels before the method 700 proceeds to the selection of block 720, described below. It is to be appreciated that the beam directions may not be the same for each channel.

Next, in block 720, one of the channels is selected based on the determined energy levels. As mentioned above, in one aspect, energy levels are determined for only one channel and this channel may be selected based on the determined energy levels. The selection can be performed, for example, by the processing system 204 of FIG. 2.

In one aspect, one of the channels is selected by first determining, for each of the channels, one or more values or metrics based on the energy levels determined for the channel. The determined energy levels can be denoted $E_1$, $E_2, \ldots, E_N$, where N is the number of energy levels determined for the channel. N may be different for different channels. A number of different values can be determined based on the energy levels, as described below.

One value that can be determined is the highest energy level. Thus, in one aspect, the one or more determined values comprises an ultimate value, $V_U$, defined as the maximum of $E_1, E_2, \ldots E_N$. Another value that can be determined is the second highest energy level. Thus, in one aspect, the one or more determined values comprises a penultimate value, $V_P$, defined as the maximum of the set of energy levels excluding $V_U$ or the second highest value.

Other values can be determined based on a cumulative density function of the energy levels. Thus, in one aspect, the one or more determined values comprises a density function value, P, defined as the value for which a defined percentage of the energy levels are greater than or equal to the density function value. Relatedly, the one or more determined values may comprise a value for which a defined percentage of the energy levels are less than or equal to the density function value. Because of the discrete nature of the cumulative density functions, many values may satisfy one of the criteria above. Accordingly, the density function value, P, may be determined as the highest value satisfying the criterion, the lowest value satisfying the criterion, or a value between these values.

Still other values can be determined based on any function of the energy levels. The values can be determined based on a coherent or an incoherent combining of the energy levels. In one aspect, the values are determined for each channel based on the energy levels determined for the channel. In another aspect, one or more values are determined based on the energy levels determined for more than channel.

Generally, it can be assumed that the noise level, $N_0$, is directionally and frequency independent. Of course, this may not always be true. However, assuming that the noise is omni-directional, one or more noise-independent values may be determined based on the energy levels. For example, the average of the energy levels within a defined range of determined noise-free direction can be used as an estimate of the noise to be subtracted from the energy levels.

In one aspect, a minimum value, $V_M$, is determined as the minimum of $E_1, E_2, \ldots, E_N$. An estimate of the SNR (signal-to-noise ratio) can be determined as $(V_U - V_M) / V_M$. In one aspect, the SNR is compared to a determined threshold to determine if the channel is empty.

In one aspect, one or more of the values are compared to one or more defined thresholds to determine if the channel should be selected. For example, in one aspect, if $V_U$ is less than a defined ultimate threshold, $T_U$, it is determined that the channel is not in use and the channel is selected. In one aspect, if $V_P$ is less than a defined penultimate threshold, $T_P$, the channel is selected.

In another aspect, the one or more values are compared to the values determined for other channels to determine and select a best channel. For example, in one aspect, the channel with the lowest $V_U$ is selected.

Once a channel is selected in block 720, the method 700 continues to block 730, in which communication over the selected channel occurs. The communication can be performed, for example, by the transceiver 214 of FIG. 2. The communication can also involve at least one of the processing system 204, memory 205, or antenna 216 of FIG. 2. The communication can comprise transmission, reception, or both. The communication can comprise the communication of control information, audiovisual content, or other data.

In one aspect, the selection of block 720 comprises selecting one or more of the plurality of beam directions of the selected channel and the communication of block 730 comprises communicating over the selected beam directions. For example, if a channel is selected because the second highest energy level, $V_P$, is below a threshold, $T_P$, but it has been determined that the highest energy level, $V_U$, is above a threshold, $T_U$, the beam direction associated with the highest energy level may be excluded from the selected beam directions. In one aspect, the beam directions of the selected channel having an energy level less than or equal to a defined threshold are selected.

The thresholds described herein, including but not limited to, $T_U$ and $T_P$, can be based on a number of factors, including the number of energy levels determined, N, the noise level, $N_0$, or channel characteristics such as frequency or SNR.

As mentioned above, narrower beams may be advantageous because each beam may be characterized by a greater gain and increased signal to noise ratio (SNR) as compared to the beams used in the quasi-omni pattern. Accordingly, the above-described method 700 can be particularly useful when communications over the channel or channels being measured are below the noise floor resulting from use of a quasi-omni pattern. However, when communication over the channel or channels being measured are above the noise floor resulting from use of a quasi-omni pattern, the method 700 can be performed by substituting the plurality of energy levels in block 710 with a single energy level.

Accordingly, in one aspect, before an energy level of a channel is measured for each of a plurality of receive beam directions in block 710, a quasi-omni energy level is determined. If the quasi-omni energy level is above a quasi-omni threshold, $T_Q$, it is determined that the channel is in use and further measurement is not performed. However, if the quasi-omni energy level is below the threshold, $T_Q$, the method 700 continues to block 710 where energy levels for a plurality of receive beam directions are determined, in order to confirm that the channel is not in use or to determine that the channel is in use.

This hierarchical approach can be expanded to more than two levels. For example, in one aspect, if it is determined that a channel is not in use based on a quasi-omni energy level, a plurality of sector energy levels are determined for a plurality of receive sector directions. If it is still determined that the channel is not in use based on the sector energy levels, a plurality of beam energy levels are determined for a plurality of beam directions, where each of the beam directions is narrower than the sector directions. If it is still determined that the channel is not in use, the channel is selected and communication is performed, as described with respect to blocks 720 and 730.

Figure 8:
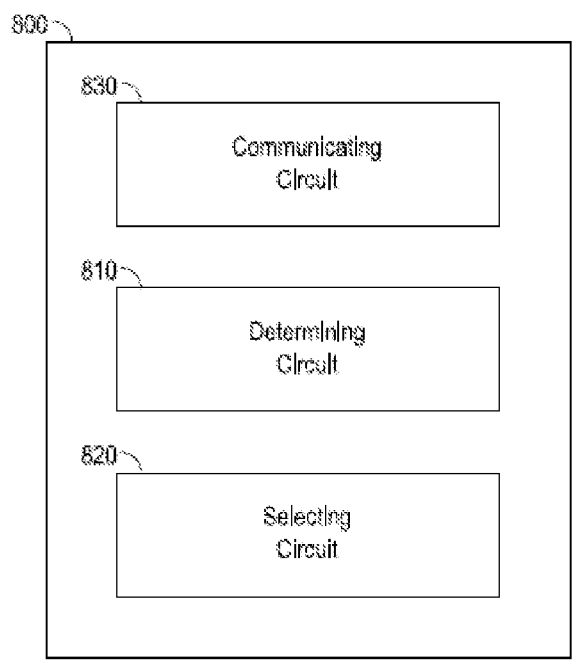
FIG. 8 is a simplified block diagram of a sample aspect of an apparatus configured to provide channel selection operations as taught herein.

The functionality described herein (e.g., with regard to one or more of the accompanying figures) may correspond in some aspects to similarly designated "means for" functionality in the appended claims. Referring to FIG. 8, an apparatus 800 is represented as a series of interrelated functional circuits or modules. A communicating circuit 830 may correspond at least in some aspects to, for example, a processing system, a network interface, an air interface, a transmitter, a receiver, a transceiver, or one or more antennas, as discussed herein. The communicating circuit 830 may wirelessly communicate over a channel or communicate over one or more wires. Means for communicating may include the communication circuit 830. A determining circuit 810 may correspond at least in some aspects to, for example, a processing system, or a signal detector, as described herein. The determining circuit 810 may determine, for each of one or more channels, a plurality of energy levels of a respective plurality of signals received via a respective plurality of beam directions. The determining circuit 810 may determine, for each of the one or more channels, one or more values based on the determined energy levels. Means for determining may include the determining circuit 810. A selecting circuit 820 may correspond at least in some aspects to, for example, a processing system, as described herein. The selecting circuit 820 may select a channel based on determined energy levels. Means for selecting may include the selecting circuit 820.

The functionality of the circuits described with respect to FIG. 8 may be implemented in various ways consistent with the teachings herein. In some aspects, the functionality of these modules may be implemented as one or more electrical components. In some aspects, the functionality of these blocks may be implemented as a processing system including one or more processor components. In some aspects, the functionality of these modules may be implemented using, for example, at least a portion of one or more integrated circuits (e.g., an ASIC). As discussed herein, an integrated circuit may include a processor, software, other related components, or some combination thereof. The functionality of these modules also may be implemented in some other manner as taught herein. In some aspects, one or more of any dashed blocks in FIG. 8 or other Figures are optional.

One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The processing system, or any part of the processing system, may provide the means for performing the functions recited herein. By way of example, the processing system executing instructions or code may provide the means for determining, for each of one or more channels, a plurality of energy levels of a respective plurality of signals received via a respective plurality of beam directions, means for selecting one of the channels based on the determined energy levels, means for communicating over the selected channel, means for determining, for each of the one or more channels, one or more values based on the determined energy levels, and/or means for comparing one or more of the values to one or more defined thresholds. Alternatively, the code on the computer-readable medium, or the computer-readable medium itself, may provide the means for performing the functions recited herein.

Those skilled in the art will recognize how best to implement the described functionality presented throughout this disclosure depending on the particular application and the overall design constraints imposed on the overall system.

It is understood that any specific order or hierarchy of steps described in the context of a method or software module is being presented to provide an examples of a wireless node. Based upon design preferences, it is understood that the specific order or hierarchy of steps may be rearranged while remaining within the scope of the invention.

The previous description is provided to enable any person skilled in the art to fully understand the full scope of the disclosure. Modifications to the various configurations disclosed herein will be readily apparent to those skilled in the art. Thus, the claims are not intended to be limited to the various aspects of the disclosure described herein, but is to be accorded the full scope consistent with the language of claims, wherein reference to an element in the singular is not intended to mean "only one" unless specifically so stated, but rather "one or more." Unless specifically stated otherwise, the term "some" refers to one or more. A claim that recites at least one of a combination of elements (e.g., "at least one of A, B, or C") refers to one or more of the recited elements (e.g., A, or B, or C, or any combination thereof). All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of communicating, the method comprising:
determining, for each of one or more channels, a plurality of energy levels of a respective plurality of signals received via a respective plurality of beam directions that are associated with at least one first communication range, wherein the determination comprises determining a plurality of sub-interval energy levels for each of a respective plurality of sub-intervals and one of the determined energy levels is a maximum of the sub-interval energy levels;
selecting one of the one or more channels based on whether any of the determined energy levels are indicative of channel interference, whereby the channel is selected to avoid interference from an interfering apparatus; and
communicating with another apparatus over the selected channel, wherein the communication with the other apparatus is associated with a second communication range that is shorter than each of the at least one first communication range.

2. The method of claim 1, wherein the selecting one of the one or more channels comprises:
determining, for each of the one or more channels, one or more values based on the determined energy levels; and
comparing the determined one or more values to one or more thresholds.

3. The method of claim 2, wherein the determining, for each of the one or more channels, the one or more values comprises:
determining, for each of the one or more channels, at least one of a highest of the determined energy levels, a second highest of the determined energy levels, a lowest of the determined energy levels, or a value based on a cumulative density function of the determined energy levels.

4. The method of claim 1, wherein the selecting one of the one or more channels comprises:
determining one or more values based on at least two of the determined energy levels; and
comparing the determined one or more values to one or more noise-independent values.

5. The method of claim 1, wherein:
the selecting one of the one or more channels comprises selecting one or more of the plurality of beam directions; and
the communicating over the selected channel comprises communicating over the selected one or more beam directions.

6. The method of claim 5, wherein the selecting one or more of the plurality of beam directions is based on whether the determined energy levels are less than or equal to a threshold.

7. The method of claim 1, wherein the communicating comprises transmitting data indicative of the selected channel.

8. The method of claim 1, where each of the sub-intervals is less than or equal to a period of transmission in a transmit beam direction of the interfering apparatus.

9. The method of communicating comprising:
determining, for each of one or more channels, a plurality of energy levels of a respective plurality of signals received via a respective plurality of beam directions that are associated with at least one first communication range;
selecting one of the one or more channels based on whether any of the determined energy levels are indicative of channel interference, whereby the channel is selected to avoid interference from an interfering apparatus;
communicating with another apparatus over the selected channel, wherein the communication with the other apparatus is associated with a second communication range that is shorter than each of the at least one first communication range;
determining a quasi-omni energy level for a particular channel of the one or more channels; and
determining that the particular channel may be available based on the quasi-omni energy level.

10. An apparatus for communicating, the apparatus comprising:
a processing system configured to determine, for each of one or more channels, a plurality of energy levels of a respective plurality of signals received via a respective plurality of beam directions that are associated with at least one first communication range, wherein the determination comprises determining a plurality of sub-interval energy levels for each of a respective plurality of sub-intervals and one of the determined energy levels is a maximum of the sub-interval energy levels, and to select one of the one or more channels based on whether any of the determined energy levels are indicative of channel interference, whereby the channel is selected to avoid interference from an interfering apparatus; and
a transceiver configured to communicate with another apparatus over the selected channel, wherein the communication with the other apparatus is associated with a second communication range that is shorter than each of the at least one first communication range.

11. The apparatus of claim 10, wherein the processing system is configured to determine, for each of the one or more channels, one or more values based on the determined energy levels, and to compare the determined one or more values to one or more thresholds.

12. The apparatus of claim 11, wherein, the processing system is configured to determine, for each of the one or more channels, at least one of a highest of the determined energy levels, a second highest of the determined energy levels, a lowest of the determined energy levels, or a value based on a cumulative density function of the determined energy levels.

13. The apparatus of claim 10, wherein the processing system is configured to determine one or more values based on at least two of the determined energy levels, and to compare the determined one or more values to one or more noise-independent values.

14. The apparatus of claim 10, wherein:
the processing system is configured to select one or more of the plurality of beam directions; and
the transceiver is configured to communicate over the selected one or more beam directions.

15. The apparatus of claim 14, wherein the processing system is configured to select one or more of the plurality of beam directions based on whether the determined energy levels are less than or equal to a threshold.

16. The apparatus of claim 10, wherein the transceiver is configured to transmit data indicative of the selected channel.

17. The apparatus of Claim 10, wherein each of the sub-intervals is less than or equal to a period of transmission in a transmit beam direction of the interfering apparatus.

18. The apparatus for communicating comprising:
a processing system configured to determine, for each of one or more channels, a plurality of energy levels of a respective plurality of signals received via a respective plurality of beam directions that are associated with at least one first communication range, and to select one of the one or more channels based on whether any of the determined energy levels are indicative of channel interference, whereby the channel is selected to avoid interference from an interfering apparatus;
a transceiver configured to communicate with another apparatus over the selected channel, wherein the communication with the other apparatus is associated with a second communication range that is shorter than each of the at least one first communication range,
wherein the processing system is further configured to determine a quasi-omni energy level for a particular channel of the one or more channels and determine that the particular channel may be available based on the quasi-omni energy level.

19. An apparatus for communicating, the apparatus comprising:
means for determining, for each of one or more channels, a plurality of energy levels of a respective plurality of signals received via a respective plurality of beam directions that are associated with at least one first communication range, wherein the determination comprises determining a plurality of sub-interval energy levels for each of a respective plurality of sub-intervals and one of the determined energy levels is a maximum of the sub-interval energy levels;
means for selecting one of the one or more channels based on whether any of the determined energy levels are indicative of channel interference, whereby the channel is selected to avoid interference from an interfering apparatus; and
means for communicating with another apparatus over the selected channel, wherein the communication with the other apparatus is associated with a second communication range that is shorter than each of the at least one first communication range.

20. The apparatus of claim 19, wherein the means for selecting comprises:
means for determining, for each of the one or more channels, one or more values based on the determined energy levels; and
means for comparing the determined one or more values to one or more thresholds.

21. The apparatus of claim 20, wherein the means for determining, for each of the one or more channels, the one or more values comprises:
means for determining, for each of the one or more channels, at least one of a highest of the determined energy levels, a second highest of the determined energy levels, a lowest of the determined energy levels, or a value based on a cumulative density function of the determined energy levels.

22. The apparatus of claim 19, wherein the means for selecting comprises:
means for determining one or more values based on at least two of the determined energy levels; and
means for comparing the determined one or more values to one or more noise-independent values.

23. The apparatus of claim 19, wherein:
the means for selecting comprises means for selecting one or more of the plurality of beam directions; and
the means for communicating over the selected channel comprises means for communicating over the selected one or more beam directions.

24. The apparatus of claim 23, wherein the means for selecting one or more of the plurality of beam directions comprises means for selecting one or more of the plurality of beam directions based on whether the determined energy levels are less than or equal to a threshold.

25. The apparatus of claim 19, wherein the means for communicating comprises means for transmitting data indicative of the selected channel.

26. The apparatus of Claim 19, where each of the sub-intervals is less than or equal to a period of transmission in a transmit beam direction of the interfering apparatus.

27. The apparatus for communicating comprising:
means for determining, for each of one or more channels, a plurality of energy levels of a respective plurality of signals received via a respective plurality of beam directions that are associated with at least one first communication range;
means for selecting one of the one or more channels based on whether any of the determined energy levels are indicative of channel interference, whereby the channel is selected to avoid interference from an interfering apparatus;
means for communicating with another apparatus over the selected channel, wherein the communication with the other apparatus is associated with a second communication range that is shorter than each of the at least one first communication range;
means for determining a quasi-omni energy level for a particular channel of the one or more channels; and
means for determining that the particular channel may be available based on the quasi-omni energy level.

28. A non-transitory computer-readable medium comprising instructions that when executed cause an apparatus to:
determine, for each of one or more channels, a plurality of energy levels of a respective plurality of signals received via a respective plurality of beam directions that are associated with at least one first communication range, wherein the determination comprises determining a plurality of sub-interval energy levels for each of a respective plurality of sub-intervals and one of the determined energy levels is a maximum of the sub-interval energy levels;
select one of the one or more channels based on whether any of the determined energy levels are indicative of channel interference, whereby the channel is selected to avoid interference from an interfering apparatus; and
communicate with another apparatus over the selected channel, wherein the communication with the other apparatus is associated with a second communication range that is shorter than each of the at least one first communication range.

29. A wireless node comprising:
at least one antenna configured to receive a plurality of wireless signals via a respective plurality of beam directions that are associated with at least one first communication range;
a processing system configured to determine, for each of one or more channels, a plurality of respective energy levels for the plurality of wireless signals received via the at least one antenna, wherein the determination comprises determining a plurality of sub-interval energy levels for each of a respective plurality of sub-intervals and one of the determined energy levels is a maximum of the sub-interval energy levels, and to select one of the one or more channels based on whether any of the determined energy levels are indicative of channel interference, whereby the channel is selected to avoid interference from an interfering node; and a transceiver configured to communicate with another node, via the at least one antenna, over the selected channel, wherein the communication with the other node is associated with a second communication range that is shorter than each of the at least one first communication range.

* * * * *